United States Patent [19]

Grootaert et al.

[11] Patent Number: 5,478,652
[45] Date of Patent: Dec. 26, 1995

[54] FLUOROELASTOMER COMPOSITION WITH IMPROVED BONDING PROPERTIES

[75] Inventors: Werner M. Grootaert, Washington; Robert E. Kolb, Ramsey; George H. Millet, Washington, all of Minn.

[73] Assignee: Minnesota Mining and Manufacturing Company, St. Paul, Minn.

[21] Appl. No.: 429,201

[22] Filed: Apr. 26, 1995

Related U.S. Application Data

[62] Division of Ser. No. 184,268, Jan. 21, 1994, which is a division of Ser. No. 63,116, May 18, 1993, Pat. No. 5,284,611, which is a continuation of Ser. No. 608,216, Nov. 2, 1990, abandoned, which is a division of Ser. No. 369,754, Jun. 22, 1989, abandoned.

[51] Int. Cl.[6] .................................................. B32B 27/00
[52] U.S. Cl. ........................ 428/422; 428/447; 428/457
[58] Field of Search ................................. 428/422, 447, 428/457

[56] References Cited

U.S. PATENT DOCUMENTS

| | | | |
|---|---|---|---|
| 2,732,398 | 1/1956 | Brice et al. | 260/503 |
| 3,655,727 | 4/1972 | Patel et al. | 260/470 |
| 3,686,143 | 8/1972 | Bowman | 260/47 |
| 3,712,877 | 6/1973 | Patel et al. | 260/87.7 |
| 3,752,787 | 8/1973 | de Brunner | 260/41 |
| 3,776,960 | 12/1973 | Koshar | 260/607 |
| 3,794,687 | 2/1974 | Koshar | 260/607 |
| 3,857,807 | 12/1974 | Kometani et al. | 260/29.6 |
| 3,876,654 | 4/1975 | Pattison | 260/30.4 |
| 3,933,732 | 1/1976 | Schmiegel | 260/42.27 |
| 3,984,357 | 10/1976 | Koshar | 260/2 R |
| 4,053,519 | 10/1977 | Koshar et al. | 260/607 |
| 4,054,596 | 10/1977 | Koshar et al. | 560/150 |
| 4,069,233 | 1/1978 | Koshar | 260/347.2 |
| 4,115,295 | 9/1978 | Robins et al. | 528/90 |
| 4,233,421 | 11/1980 | Worm | 525/343 |
| 4,259,463 | 3/1981 | Moggi et al. | 525/331 |
| 4,287,320 | 9/1981 | Kolb | 525/340 |
| 4,358,559 | 11/1982 | Holcomb et al. | 524/380 |
| 4,446,270 | 5/1984 | Guenthner et al. | 524/433 |
| 4,882,390 | 11/1989 | Grootaert et al. | 525/326.3 |

FOREIGN PATENT DOCUMENTS

| | | |
|---|---|---|
| 581641 | 5/1985 | Australia . |
| 0182299A2 | 11/1983 | European Pat. Off. . |
| 0120462A1 | 3/1989 | European Pat. Off. . |
| 976955 | 9/1964 | Germany . |
| 3702141A1 | 1/1987 | Germany . |
| 60-19325 | 10/1975 | Japan . |
| 60-19324 | 10/1985 | Japan . |

OTHER PUBLICATIONS

"Technical Bulletin Pigments", No. 75, Degussa Corporation, Ridgefield Park, N.J., Brochure No. Pig. 75 1-4-1288DD, Dec. 1988 pp. 5-6.
"Selection Guide to Dow Corning Organosilane Chemicals", Brochure No. 23-181E-85.
"Silicone Compounds Register & Review", Retrarch Systems, 1987, pp. 105-106.
Davis, D. J., & Kosmala, J. L. "A Practical Approach to Fluoroelastomer Adhesion to Metal", presented at the Energy Rubber Group Adhesion Symposium, Houston, Tex., May 30, 1985.
Chemlok™ 607, Brochure No. DS10-6005J, Lord Corp., 1981.
"A Guide to Dow Corning Silane Coupling Agents", Form No. 23-012B-85, published by Dow Corning Corporation, Midland, Mi.
"Dynamar™ Brand Metal Bonding Agent-5150", Brochure No. Y-IFE5150 (63.05) RI, 3M Company, 1983.
West, A. C., & Holcomb, A. G., "Fluorinated Elastomers", *Kirk-Othm Encyclopedia of Chemical Technology*, vol. 8, 3rd Ed., John Wiley & Sons, Inc., pp. 500-515 (1979).
Basic Principles of Organic Chemistry, Roberts and Caserio, W. A. Benjamin Company, N.Y., N.Y., 1965, pp. 756-760.
Organic Synthesis, Vo. I, pp. 718-725, vol. III, pp. 1709-1715 Reinhold Publishing Co., N.Y., N.Y., 1957.

*Primary Examiner*—Peter D. Mulcany
*Attorney, Agent, or Firm*—Gary L. Griswold; Walter N. Kirn; Eloise J. Maki

[57] ABSTRACT

A curable fluoroelastomer composition comprising: (A) fluoroelastomer gum comprising interpolymerized, repeating units derived from vinylidene fluoride, tetrafluoroethylene, and copolymerizable hydrocarbon olefin, (B) polyhydroxy compound, (C) organo-onium compound, and (D) fluoroaliphatic sulfonyl compound adhesion promoter, where the amount of fluoroaliphatic sulfonyl compound in the elastomeric composition is sufficient to result in greater adhesion of the elastomeric composition, after curing, to an inorganic surface coated with a primer composition comprising aminosilane compound, than can be achieved between an elastomeric composition comprising (A), (B), and (C), after curing, and an inorganic surface coated with said primer composition comprising aminosilane compound.

12 Claims, No Drawings

FLUOROELASTOMER COMPOSITION WITH IMPROVED BONDING PROPERTIES

This is a division of application Ser. No. 08/184,268, filed Jan. 21, 1994, which is a divisional application of U.S. Ser. No. 08/063,116, filed on May 18, 1993, U.S. Pat. No. 5,284,611 which is a continuation of U.S. Ser. No. 07/608,216, filed on Nov. 2, 1990, and now abandoned, which is a divisional of U.S. Ser. No. 07/369,754, filed Jun. 22, 1989, and now abandoned.

BACKGROUND

This invention relates to fluoroelastomer compositions comprising elastomeric copolymer of tetrafluoroethylene, vinylidene fluoride, and one or more hydrocarbon olefins and curing agents. In another aspect, it relates to a process for curing the shaped or formed articles of such fluoroelastomer composition and to the resulting shaped or formed, cured articles. In a still further aspect, it relates to a fluoroelastomer composition which further comprises fluoroaliphatic sulfonamide compounds as curing agents.

Silane compounds have been used to improve adhesion between polymer substrates and inorganic materials or substrates, such as metals, fiberglass and glass (see for example, "A Guide to Dow Corning Silane Coupling Agents", Form No. 23-012B-85, published by Dow Corning Corporation, Midland, Mich.). In some applications, compositions comprising silane compounds are hydrolyzed to their silanol form which may then react with the inorganic material, e.g., by reacting with hydroxyl moieties present on the inorganic material surface. Generally, the silane, compound also has an organofunctional group which reacts with the polymeric material thus enhancing the bonding between the inorganic material and the polymer. Compositions comprising silane compounds have been successfully used as adhesion promoters with some fluoroelastomers, see for example, "'Dynamar' Bond Metal Bonding Agent- 5150", Brochure No. Y-IFE5150-2 (73.05)RI, published by the 3M Company, 1983. However, applicant has discovered that copolymers comprising tetrafluoroethylene, vinylidene fluoride, and one or more hydrocarbon olefins, cannot be bonded to inorganic substrates using only silane compounds to achieve good bonding or adhesion between inorganic substrates and the fluoroelastomers.

Applicants' invention improves the bonding or adhesion between curable fluoroelastomers comprising interpolymerized repeating units derived from vinylidene fluoride, tetrafluoroethylene, and hydrocarbon olefin (e.g., propylene) and inorganic substrates, such the metal cores, supports or inserts used in various molded seals such as shaft seals, valve stem seals, and gaskets.

In one aspect, this invention provides a curable elastomeric composition comprising the following components:

(A) fluoroelastomer gum comprising interpolymerized, repeating units derived from vinylidene fluoride, tetrafluoroethylene, and copolymerizable hydrocarbon olefin, e.g. propylene, (B) polyhydroxy compound, (C) organo-onium compound, and (D) fluoroaliphatic sulfonyl compound adhesion promoter (e.g., fluoroaliphatic sulfonamide and fluoroaliphatic disulfone).

The amount of fluoroaliphatic sulfonyl compound in the elastomeric composition is sufficient to result in greater adhesion of the elastomeric composition, after curing, to an inorganic (e.g., metal) surface coated with a primer composition comprising aminosilane compound, than can be achieved by an elastomeric composition without the fluoroaliphatic sulfonyl compound comprising said component (A), (B), and (C), after curing, and an inorganic surface coated with said primer composition comprising aminosilane compound.

In another aspect this invention provides a combination comprising (1) the elastomeric composition in its cured state and (2) a substrate having an inorganic surface coated with the primer composition comprising aminosilane compound to which the cured elastomeric composition is bonded.

In yet another aspect, this invention provides a bonding composition for application to an inorganic surface, the composition comprising the following components:

(E) aminosilane compound, and (F) fluoroaliphatic sulfonyl compound adhesion promoter where components (E) and (F) are present in said bonding composition in such relative proportions and concentrations as to result in the desired adhesion between a cured elastomeric composition comprising the above-described components (A), (B) and (C), and a substrate having an inorganic surface.

In another aspect, this invention provides a combination comprising (1) a cured elastomeric composition comprising said components (A), (B) and (C), and (2) a substrate having an inorganic surface coated with said bonding composition.

In another aspect, this invention provides a combination comprising the steps of:

(1) providing a mixture comprising the fluoroelastomer gum (A), polyhydroxy compound, (B), organo-onium compound (C), fluoroaliphatic sulfonyl compound adhesion promoter (D), and acid acceptor, e.g. calcium hydroxide, (2) preparing a primer composition comprising aminosilane compound, (3) applying the primer composition to the inorganic surface of a substrate, (4) placing the coated substrate in a mold, (5) filling a mold with the mixture prepared in step (1), (6) curing the mixture, and (7) removing the resulting molded article from the mold.

In yet another aspect, this invention provides a method comprising the steps of:

(i) providing a mixture comprising the fluoroelastomer gum (A), polyhydroxy compound (B) organo-onium compound (C), and acid acceptor, (ii) preparing a bonding composition comprising aminosilane compound and fluoroaliphatic sulfonyl compound adhesion promoter, (iii) applying the bonding composition to the inorganic surface of a substrate, (iv) placing the coated substrate in a mold, (v) filling the mold with the mixture prepared in step (i), (vi) curing the mixture, and (vii) removing the resulting molded article from the mold.

Preferred elastomeric compositions can additionally include one or more diorgano sulfur oxide compounds as co-curing agents.

The invention further provides shaped or formed, cured articles made according to one of the methods described above.

Fluoroelastomers useful in this invention are fluorine-containing polymers comprising interpolymerized, repeating units derived from vinylidene fluoride, tetrafluoroethylene, and one or more, preferably one or two, copolymerizable hydrocarbon olefin monomers. Such fluoroelastomers are known in the art.

One subclass of such fluoroelastomers are saturated (i.e. essentially free of ethylene or acetylenic unsaturation), and are those consisting essentially of vinylidene fluoride, tetrafluoroethylene, and one or more copolymerizable hydrocarbon olefin monomers.

The hydrocarbon olefin monomers can be represented by those having the formula R'R'C=CR'R' wherein R' groups can be the same or different and can be selected from the group consisting of hydrogen and aliphatic radicals such as alkenyl and alkyl radicals. Where R' is alkenyl or alkyl, it can be straight chain or branched, and has one to four carbon atoms. Representative examples of olefin monomers are ethylene, propylene, and butene (e.g., isobutylene, butene-1, and butene-2, and butadiene). The molar ratios of the monomers used in making the fluoropolymer will be selected to achieve the properties (e.g., chemical resistance, high temperature stability, low temperature flexibility, and fluid, e.g. fuel, coolants and lubricants, resistance) desired in the cured polymer. The selection of such ratios will be within the skill of the art, based on the known relationships between the relative amounts of particular monomers and the physical properties of the copolymer. Generally, the copolymers of this class comprise about 2 to 90 mole percent vinylidene fluoride, 5 to 65 mole percent tetrafluoroethylene, and 5 to 45 mole percent hydrocarbon olefin. Preferably they comprise about 2 to 65 mole percent of vinylidene fluoride, 20 to 60 mole percent of tetrafluoroethylene, and 10 to 50 mole percent hydrocarbon olefin. Preferably, the hydrocarbon olefin is propylene.

Many of the fluoroelastomers or gums useful in this invention are described in the prior art, and can be prepared according to methods described in the prior art. For example Jap. Pat. No. Sho 60[1985]-19324, and Jap. Pat. No. Sho 60[1985]-19325 describe many of the fluoroelastomers useful in this invention and methods of preparing such fluoroelastomers.

Generally, the aminosilane compounds useful in this invention are di- or tri-alkoxy (e.g., methoxy, and ethoxy) or acetoxy silanes having one or two organo groups which are bonded directly to the silicon atom. At least one of said organo groups must have a primary amino moiety. It is believed that in use, the silane compound is hydrolyzed to a silanol (e.g., by adventitious moisture or by added water), that is, the silane compound's alkoxy and/or acetoxy moieties are hydrolyzed to hydroxyl moieties. These hydroxyl moieties are believed to react with the inorganic surface, and to react with the hydroxyl moieties on other silanol molecules (via condensation reactions), to result in polysiloxane molecules linked or bonded to the inorganic surface.

A class of the aminosilane compounds useful in this invention have the general formula:

$$(R^1O)_aSi(R^2)_b \qquad (I)$$

where a is 2 or 3, and preferably 3; b is 1 or 2, and preferably 1, and a+b is 4; $R^1O$ is a monovalent, organic, hydrolyzable group, such as an alkoxy group having 1 to 8, and preferably 1 to 4, carbon atoms, e.g. methoxy, ethoxy or acetoxy groups; $R^2$ is a monovalent organic radical selected from the group consisting of alkyl, alkenyl, aryl radicals and combinations thereof such as arylalkyl and arylalkenyl radicals, wherein at least one of said $R^2$ groups contains a primary amino moiety. $R^2$ may be straight chain, branched, and, where sufficiently large, cyclic. $R^2$ may contain one or more catenary (i.e., backbone) hetero atoms such as sulfur, oxygen, and nitrogen, and it may be substituted with such hetero atoms. Generally $R^2$ will have from 1 to 20 carbon atoms, and preferably will have from one to 12 carbon atoms. Some of the $R^2$2 groups can be represented by the general formula:

where c is a number from 1 to 5, and preferably from 1 to 3; $R^3$ and $R^4$ moieties are divalent organic moieties which each may independently be selected from the group consisting of alkylene, alkenylene, arylene moieties and combinations thereof. $R^3$ and $R^4$ generally will have from 1 to 10 carbon atoms, and preferably from 1 to 4 carbon atoms. Examples of $R^3$ and $R^4$ moieties are propylene, ethylene, butylene, oxydiethylene or phenylene moieties.

Representative aminosilane compounds useful in this invention include:
3-aminopropyltriethyoxysilane,
N-(2-aminoethyl-)3-aminopropyltrimethoxysilane,
N-[2(vinylbenzylamino)ethyl]3-aminopropyltrimethoxysilane,
4-aminobutyltriethoxysilane,
(aminoethylaminomethyl)phenethyltrimethoxysilane,
N-(2-aminoethyl)-3-aminopropylmethyldimethoxysilane,
N-2-aminoethyl-3-aminopropyltris(2-ethylhexoxy)silane,
6-(aminohexylaminopropyl)trimethoxysilane,
p-aminophenyltrimethoxysilane,
3-(1-aminopropoxy)-3,3-dimethyl-1-propenyltrimethoxysilane, 3-aminopropyltris(methoxyethoxyethoxy)silane,
3-aminopropylmethyldiethoxysilane,
3-aminopropyltriethoxysilane,
3-aminopropyltrimethoxysilane, and
ω-aminoundecyltrimethoxysilane.

The aminosilane compounds useful in this invention can be prepared by known methods such as those described in "Technical Bulletin Pigments", No 75, published by the Degussa Corporation, Ridgefield Park, N.J., brochure no. Pig. 75 1-4-1288 DD, issued December 1988, pp. 5–6.

Many of the aminosilane compounds useful in this invention are commercially available, for example, from the Dow Corning Corporation, as DOW CORNING® A-1100, Z-6020, Z-6026 and Z-6032 silanes. These products are described in "Selection Guide to Dow Corning Organosilane Chemicals", brochure no 23-181E-85, and from Petrarch Systems, Bristol, Pa., as A0695, A0696, A0698, A0699, A0700, A0710, A0720, A0724, A0725, A0728, A0733, A0742, A0750, A0800, and A0808. These products are described in "SILICON COMPOUNDS Register and Review" published by Petrarch Systems, 1987, pp 105 to 106.

The primer compositions comprising aminosilane compound are solutions, dispersions or mixtures of aminosilane compound, alcohol and water. Primer compositions comprising a mixture of one or more aminosilane compounds can also be used in this invention. The selection of the alcohol will depend upon the solubility of the desired aminosilane compound in that alcohol, however, generally methanol and ethanol are useful solvents in this invention. Preferably, the alcohol will easily evaporate at room temperature to facilitate the formation of a dried coating of the primer composition on the inorganic surface of the substrate. One method of preparing the primer composition is to dissolve or disperse the desired quantity of aminosilane compound in a mixture comprising a portion of the total amount of alcohol comprising said primer composition and all of the water. The resulting mixture is then diluted with additional alcohol to achieve the desired final concentration of aminosilane. Typically, one part of this mixture would be diluted with an additional 3 to 10 parts by weight of alcohol. Before application to the substrate, the primer composition should be allowed to stand at room temperature for 15 seconds to 48 hours (depending upon the aminosilane compound) to permit the aminosilane compound to hydrolyze to its silanol form. The amount of water in the primer composition should be sufficient to result in the hydrolysis of a major portion of the hydrolyzable groups in the aminosilane compound to hydroxyl groups, and preferably it should be sufficient to result in the hydrolysis of essentially all of the hydrolyzable groups in the aminosilane compound. Excess water in the primer composition should be avoided because it can interfere with bonding between the substrate and the elastomer. Typically, alcohol will comprise about 85 to 96.4 weight percent of the primer composition, water will comprise about 0.05 to 5, and preferably 0.1 to 1.0 weight percent, and aminosilane compound will comprise about 0.1 to 10.0 weight percent, and preferably 0.1 to 5, of the primer composition. Generally, when the fluoroaliphatic sulfonyl compound is compounded with the fluoroelastomer gum, the primer need not contain any of the fluoroaliphatic sulfonyl compound. Optionally, the primer composition may further comprise other silane compounds which are copolymerizable with the aminosilane compound but are not reactive with the fluoroaliphatic sulfonyl compound or the fluoroelastomer, e.g., vinyl triethoxysilane. One skilled in the art will recognize that the copolymerizable silane may be added to the primer composition to improve the strength, e.g. cohesive strength, of the dried primer composition coating.

Once prepared, the primer composition is applied to the inorganic surface (prepared according to procedures described herein) using any conventional method for applying coatings to substrates, e.g., immersion, spraying, painting, or curtain coating methods. After application, excess primer composition is allowed to drain off the inorganic surface of the substrate and the coating is allowed to dry either at room temperature (e.g., for about 10 to 30 min.) or the coated substrate can be heated to 50° to 60° C., or higher, e.g., 120° C., for about 15 minutes. It is believed that in addition to aiding the drying of the primer coating the heat also aids the formation of a polysiloxane network which is bonded to the substrate surface. The dried primer coating thickness is generally about 1.25 to 7.5 μm (0.05 to 0.3 mil) thick.

The fluoroaliphatic sulfonyl compounds used in this invention are adhesion promoters, which are protonic acids, i.e., having at least one —$SO_2NH$— or —$SO_2CH$— moiety. The fluoroaliphatic sulfonyl compounds in combination with aminosilane compound increase adhesion between the cured elastomeric composition and an inorganic surface. The fluoroaliphatic sulfonyl compounds increase adhesion between the cured fluoroelastomer and the inorganic surface regardless of whether the compound is compounded into the fluoroelastomer composition, or whether it is applied to the inorganic surface in the form of a bonding agent which further comprises aminosilane compound. Generally, the fluoroaliphatic sulfonyl compound is selected from the group consisting of fluoroaliphatic sulfonamides and fluoroaliphatic, disulfones.

Some of the classes of the fluoroaliphatic sulfonyl compounds useful in this invention have the general formulas:

$R_f SO_2 X$ (III)

$R_f'[SO_2 NHR^5]_2$ (IV)

wherein X is selected from the group consisting of —$NHR^6$, and —$CHR_7 SO_2 R_f$. $R^5$ and $R^6$ can be selected from the group consisting of hydrogen or monovalent organic radicals, such as alkyl, aryl or combinations thereof, having from 1 to 15, preferably 1 to 4, carbon atoms. $R^5$ and $R^6$ can be straight chain, branched chain, and if sufficiently large, cyclic or combinations thereof and may be substituted with one or more non interfering moieties, e.g., chlorine. $R^7$ is selected from H, Br, Cl, I, alkyl having 1 to 20, or preferably 1 to 4 carbon atoms, alkenyl of 3 to 4 carbon atoms, aryl (e.g., phenyl, pyridyl, naphthyl, thienyl, benzthienyl) or alkaryl (of up to 10 carbon atoms); the alkyl, aryl and alkaryl may, if desired, be substituted, for example, by one or more halogens, highly fluorinated alkysulfonyl, carboxyl, alkoxycarbonyl, nitro, alkoxy, or acyloxy.

The carbon atom of the $R_f$ or $R_f'$ which is directly bonded to the sulfur atom of the —$SO_2$—moiety must be substituted with at least one strongly electro negative or electron withdrawing group, and preferably with at least one fluorine atom or at least one highly fluorinated alkyl radical. For example, said carbon atom can be represented as follows: —$CF_2$—, —$CF(CF_3)$—, —$C(CF_3)_2$, —$CF(C_2F_5)$—, —$CFCl$—, —$CFH$— and (—$(CF=)CF$—.

$R_f$ is a monovalent fluoroaliphatic radical which is stable, inert, non-polar, oleophobic and hydrophobic. $R_f$ can be straight chain, branched chain, and if sufficiently large, cyclic, or combinations thereof, such as alkylcycloaliphatic radicals Generally $R_f$ will have 1 to 20 carbon atoms, preferably 4 to about 20, and most preferably 4 to 12. The preferred compounds are those in which the $R_f$ group is fully or substantially completely fluorinated, such as in the case where $R_f$ is perfluoroalkyl, i.e. $C_nF_{2n+1}$, where n is 4 to 20 or perfluorocycloalkyl, i.e. $C_nF_{2n-1}$, where n is 5 to 20, or combinations of perfluoroalkyl and perfluorocycloalkyl, e.g.,

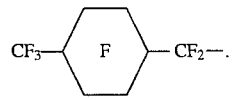

$R_f$, is a divalent fluoroaliphatic radical which is stable, inert, non-polar, oleophobic and hydrophobic. It can be straight chain, branched chain, and, if sufficiently large, cyclic or combinations thereof, such as alkylcycloaliphatic diradicals. Generally $R_f$, will have 1 to 20 carbon atoms, preferably 4 to 20, and most preferably 4 to 12. The preferred compounds are those in which the $R_f$, group is fully or substantially completely fluorinated, as in the case where $R_f$, is perfluoroalkyl, i.e. $C_nF_{2n}$, where n is 4 to 20, or perfluorocycloalkyl, i.e. $C_nF_{2n-2}$, where n is 5 to 20 or combinations thereof.

With respect to either $R_f$ or $R_f'$, the skeletal chain or carbon atoms can include divalent oxygen, hexavalent sulfur, and/or trivalent nitrogen hetero atoms, each of which is bonded only to carbon atoms, such hetero atoms providing stable linkages between fluorocarbon portions of $R_f$ or $R_f'$ and not interfering with the inert character of the radicals. Preferably where such heteroatoms are present, the skeletal chain does not contain more than one heteroatom for every two carbon atoms. An occasional carbon-bonded hydrogen atom, or chlorine atom may be present; where present, however, they preferably are present not more than once for every two carbon atoms in the chain. Where $R_f$ or $R_f'$ is or contains a cyclic structure, such structure preferably has 5 or 6 ring member atoms, 1 or 2 of which can be said heteroatoms, i.e., oxygen and/or nitrogen. Generally, $R_f$ and $R_f'$ radicals can contain 40 to 78 weight percent, preferably 50 to 78 weight percent fluorine. Examples of $R_f$ radicals are fluorinated alkyl, e.g. —$C_6F_{13}$—, $C_8F_{17}$—, and alkoxyalkyl, e.g. $C_3F_7OCF_2$—. Examples of $R_f'$ are fluorinated alkylene, e.g. —$C_4F_8$— and —$C_6F_{12}$—. Where $R_f$ and $R_f'$ are designated as a specific radical, e.g. $C_8F_{17}$—, it should be understood that this radical can represent an average structure of a mixture, e.g. $C_6F_{13}$— to $C_{10}F_{21}$—, which mixture can also include branched structures.

The fluoroaliphatic sulfonamide compounds useful in this invention can be prepared by the reaction of ammonia or primary amines with perfluoroalkane sulfonyl fluorides (e.g., sulfonyl fluorides obtained by electrochemical fluorination of alkyl or alkylene sulfonyl halides). Many of the fluoroaliphatic sulfonamides useful in this invention are known compounds (see, for example, U.S. Pat. No. 2,732, 398 (Brice et al)).

The fluoroaliphatic disulfones useful in this invention can be prepared according to methods known in the art (see, for example, U.S. Pat. Nos. 3,776,960 (Koshar et al), 4,053,519 (Koshar), 4,054,596 (Koshar), 4,069,233 (Koshar), 3,984, 357 (Koshar) and 3,794,687 (Koshar)).

Representative fluoroaliphatic sulfonamide, and fluoroaliphatic disulfone compounds useful in this invention include:

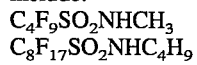
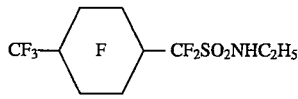

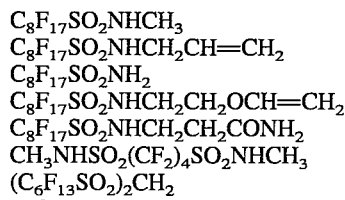

$C_8F_{17}SO_2NHCH_3$
$C_8F_{17}SO_2NHCH_2CH=CH_2$
$C_8F_{17}SO_2NH_2$
$C_8F_{17}SO_2NHCH_2CH_2OCH=CH_2$
$C_8F_{17}SO_2NHCH_2CH_2CONH_2$
$CH_3NHSO_2(CF_2)_4SO_2NHCH_3$
$(C_6F_{13}SO_2)_2CH_2$

Other representative fluoroaliphatic disulfone compounds are described in U.S. Pat. No. 4,115,295 Robins et al) in column 7, lines 10–27, and such description is herein incorporated by reference.

The fluoroaliphatic sulfonyl compounds can be used singly or one or more of such compounds may be used in this invention.

The bonding composition can be prepared using a procedure identical to that used to prepare the primer composition except that the fluoroaliphatic sulfonyl compound is dissolved or dispersed in the alcohol and water along with the aminosilane compound The selection of the alcohol depends upon on the solubility of the desired aminosilane and fluoroaliphatic sulfonyl compounds, however, generally methanol or ethanol are useful in preparing the bonding composition. Typically, the bonding composition comprises 0.1 to 10 weight percent aminosilane compound, and, preferably 0.1 to 5, 0.5 to 5 weight percent fluoroaliphatic sulfonyl compound, and preferably 0.5 to 2, 0.5 to 5 weight percent water, and preferably 0.1 to 1.0, and 80 to 99 weight percent alcohol. Like the primer composition, the aminosilane compound in the resulting mixture should be allowed to hydrolyze, then it can be applied to the substrate according to the methods described for applying the primer composition. Like the primer coating, the bonding composition coating can be allowed to air dry or can be heated between 50° to 60° C., or higher, e.g., 120° C., for about 15 minutes The polyhydroxy compound which is admixed with the copolymer is one capable of functioning as a crosslinking agent for the copolymer. Such agents are well-known and are described in the art, e.g., U.S. Pat. Nos. 4,259,463 (Moggi et al.), 3,876,654 (Pattison), and 4,233,421 (Worm), and can include aromatic polyhydroxy compounds and aliphatic polyhydroxy compounds, and the derivatives of said compounds. Also, blends of polyhydroxy compounds may be used in this invention.

Representative aromatic, polyhydroxy compounds include the following: di-, tri-, and tetrahydroxybenzenes, naphthalenes, and anthracenes, and bisphenols of the formula

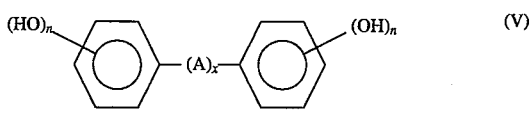

wherein A is a divalent aliphatic, cycloaliphatic, or aromatic radical of 1 to 13 carbon atoms, or a thio, oxy, carbonyl, sulfinyl, or sulfonyl radical; A is optionally substituted with one or more chlorine or fluorine atoms; x is 0 or 1; n is 1 or 2; and any aromatic ring of the polyhydroxyl compound can be optionally substituted with at least one atom of chlorine, fluorine, or bromine, or carboxyl, or an alkyl, or an acyl (e.g., a —$COR^8$ where $R^8$ is a $C_1$ to $C_8$ organic radical alkyl, aryl, or cycloalkyl group) radical. It will be understood from the above formula that the —OH groups can be attached in any position (other than number one, i.e., the carbon atoms where the A group is attached to the rings) in either ring. Specific aromatic polyhydroxy compounds include 4,4'-thiodiphenol, isopropylidene-bis(4-hydroxybenzene) (i.e., bisphenol A), hexafluoroisopropylidene-bis(4-hydroxybenzene), (i.e., bisphenol AF) and are described or illustrated in U.S. Pat. No. 4,233,421 (Worm) all of which teachings are incorporated herein by reference.

Representative aliphatic polyhydroxy compounds include fluoroaliphatic diols, e.g. 1,1,6,6-tetrahydrooctafluorohexanediol, and others, such as those described in U.S. Pat. No. 4,358,559 (Holcomb et al.) and references cited therein. Representative polyhydroxy derivatives of polyhydroxy compounds which can be used as crosslinking agents are described in U.S. Pat. No. 4,446,270 (Guenthner et al.), and include, for example, 2-(4-allyloxyphenyl)-2-(4-hydroxyphenyl) propane.

Preferred polyhydroxy compounds are aromatic polyhydroxy compounds having formula (IV) such as bisphenol A and bisphenol AF. A blend of two or more of the polyhydroxy compounds can be used in this invention. When changing from one polyhydroxy compound to another in a given composition, one skilled in the art will be able to select a curing time and temperature that will give a suitable rate of cure for a particular application.

The organo-onium compound which is admixed with the copolymer is capable of functioning as a vulcanization accelerator. An organo-onium compound is the conjugate acid of a Lewis base (e.g., phosphine, amine, ether, or sulfide) and can be formed by reacting a Lewis base with a suitable alkylating agent (e.g., an alkyl halide or acyl halide). This reaction results in the expansion of the valence of the electron donating atom of the Lewis base and a positive charge on the organo-onium compound. Many of the organo-onium compounds useful in this invention contain at least one heteroatom, i.e., a non-carbon atom such as N, P, S, O, bonded to organic or inorganic moieties. The organo-onium compounds suitable for use in this invention are known and are described in the art. See, for example, U.S. Pat. Nos. 3,655,727 (Patel et al.), 3,712,877 (Patel et al.), 3,857,807 (Kometani), 3,686,143 (Bowman), 3,933,732 (Schmiegel), 3,876,654 (Pattison), 4,233,421 (Worm), and 4,259,463 (Moggi et al.), European Patent Application Nos. 0182299A2 and 0120462A1; and also see West, A. C. and Holcomb, A. G. "Fluorinated Elastomers", *Kirk-Othmer; Encyclopedia of Chemical Technology*, Vol. 8, 3rd Ed., John Wiley & Sons, Inc., pp. 500–515 (1979). Mixtures of organo-onium compounds are also useful in this invention.

The organo-onium compounds include quaternary organo-onium compounds, such as those selected from the group consisting of ammonium, arsonium, phosphonium, stibonium amino-phosphonium, phosphorane (e.g., tri-arylphosphorane), and iminium compounds, and sulfonium compounds.

One class of quaternary organo-onium compounds are organic compounds ionically associated with an anion, wherein at least one nitrogen, phosphorus, arsenic or antimony atom is covalently bonded to four organic moieties. Some of these quaternary organo-onium compounds broadly comprise relatively positive and relatively negative ions. A hetero atom such as phosphorus, arsenic, antimony or nitrogen atom generally comprising the central atom of the positive ion. These compounds are generally known as ammonium, phosphonium, arsonium, or stibonium salts or compounds, and preferably have the general formula:

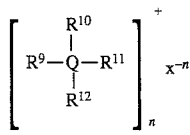

(VI)

where Q is selected from the group consisting of nitrogen, phosphorous, arsenic, and antimony; X is an organic or inorganic anion (e.g., halide, sulfate, acetate, phosphate, phosphonate, hydroxide, alkoxide, phenoxide, bisphenoxide, etc.); n is equal to the valence of the anion X; and $R^9$, $R^{10}$, $R^{11}$, and $R^{12}$ are selected from the group of radicals consisting of alkyl, aryl, alkenyl, or combinations thereof $R^9$, $R^{10}$, $R^{11}$ and $R^{12}$ can be substituted with chlorine, fluorine, bromine, cyano, —$OR^{13}$, and —$COOR^{13}$ moieties where $R^{13}$ is selected from the group consisting of $C_1$ to $C_{20}$ alkyl, aryl, aralkyl, and alkenyl. Any pair of the R groups can be connected with each other and the Q atom to form a heterocyclic ring. However, in compositions where the copolymer is derived from vinylidene fluoride, tetrafluoroethylene and propylene monomer, the polyhydroxy compound is bisphenol AF, Q is phosphorous, X is a chloride anion, n is 1, and three of the groups, $R^9$, $R^{10}$, $R^{11}$ and $R^{12}$ are phenyl moieties, the remaining R group cannot be a benzyl moiety. A preferred class of quaternary organo-onium compounds has the general formula (VI) and at least one of the groups $R^9$, $R^{10}$, $R^{11}$ or $R^{12}$ is alkyl, or alkenyl.

In another class of quaternary organo-onium compounds, the nitrogen, phosphorus, arsenic or antimony atom may be a heteroatom in a cyclic structure, e.g., 8-benzyl-1,8-diazobicyclo[5,4,0]-7-undecenium chloride.

Another class of quaternary organo-onium compounds useful in this invention are amino-phosphonium compounds, some of which are described in the art, see for example, U.S. Pat. No. 4,259,463 (Moggi et al). which descriptions are herein incorporated by reference.

Another class of quaternary organo-onium compounds useful in this invention are phosphorane compounds, such as triarylphosphorane compounds. Some of the triarylphosphorane compounds are known and described in the art, see for example, U.S. Pat. No. 3,752,787 (de Brunner), which descriptions are herein incorporated by reference. Some of the triarylphosphorane compounds useful in this invention have the general formula

wherein Ar is aryl, selected for example, from phenyl, substituted phenyl, e.g. methoxyphenyl, chlorophenyl, tolyl, and other known aryl groups, e.g. naphthyl. $R^{14}$ and $R^{15}$ are selected from the group consisting of (1) separate groups selected individually from (a) hydrogen, methyl, ethyl, propyl, and carbalkoxy ($C_1$ to $C_6$ alkyl) in the case of $R^{14}$, and b) carbalkoxy ($C_1$ to $C_6$ alkyl) cyano, and —$CONH_2$ in the case of $R^{15}$; and (2) a single group which together with the carbon atom to which the single group is attached form a cyclic group selected from

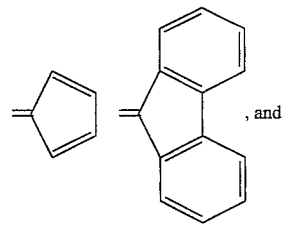

, and

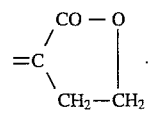

Another class of quaternary organo-onium compounds useful in this invention are iminium compounds. Some of the iminium compounds useful in this invention are organic compounds having the general formula:

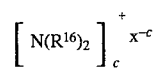

(VIII)

where $R^{16}$ is a monovalent organic radical terminated with a non-carbon atom such as P, S, O, or N, such that the organic radical is covalently bonded to the nitrogen atom through the non-carbon atom, c is the valence of the anion X, e.g., 1 or 2, and X is an organic or inorganic anion, e.g., halide, hydroxy, sulfate, thiosulfate, nitrate, formate, acetate, cyanate, thiocyanate, tetraphenylborate, 2-mercaptobenzothiazolate, phosphate, phosphonate, alkoxide, phenoxide, bisphenoxide or perchlorate ions. The positive charge of the cation can be assigned to the N atom, but it can also equally be distributed between the two nitrogen and other hetero atom to which it is bonded.

Another class of iminium compounds useful in this invention are known and described in the art, e.g., European Patent Applications 182299A2 and 120462A1, which descriptions are herein incorporated by reference.

Representative quaternary organo-onium compounds include phenyltrimethylammonium chloride, tetrapentylammonium chloride, tetrapropylammonium bromide, tetrahexylammonium chloride, tetraheptylammonium bromide, tetramethylphosphonium chloride, tetramethylammonium chloride, tetrabutylphosphonium chloride, tributylbenzyl phosphonium chloride, tetrabutylammonium chloride, tetrabutylammonium bromide, tributylallylphosphonium chloride, tetraphenylphosphonium chloride, tetraphenylarsonium chloride, tetraphenylstibonium chloride, 8-benzyl-1,8-diazobicyclo[5.4.0]7-undecenium chloride benzyltris(dimethylamino)phosphonium chloride, tributyl(2-methoxy)propyl phosphonium chloride, dibutyldiphenyl phosphonium chloride and bis(benzyldiphenylphosphine) iminium chloride.

Sulfonium compounds useful in this invention are known and described in the art, e.g., see U.S. Pat. No. 4,233,421 (Worm). A sulfonium compound is a sulfur-containing organic compound in which at least one sulfur atom is covalently bonded to three organic moieties having from 1 to 20 carbon atoms by means of carbon-sulfur covalent bonds. The organic moieties can be the same or different. The sulfonium compound generally is ionically associated with an anion. The sulfonium compounds may have more than one relatively positive sulfur atom e.g. $[(C_6H_5)_2S^+(CH_2)_4S^+(C_6H_5)_2]\ 2Cl^-$, and two of the carbon-sulfur covalent bonds may be between the carbon atoms of a divalent organic moiety, i.e., the sulfur atom may be a heteroatom in a cyclic structure.

A preferred class of sulfonium compounds are salts having the formula

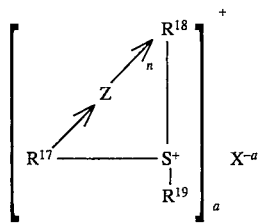

(IX)

wherein $R^{17}$, $R^{18}$, and $R^{19}$ can be the same or different, provided that at least one of such groups is aromatic. The R groups can be selected from the group consisting of aromatic radicals having 4 to 20 carbon atoms (e.g., substituted and unsubstituted phenyl, thienyl, and furanyl), and alkyl radicals having 1 to 20 carbon atoms. The alkyl radicals include substituted alkyl radicals (substituted for example with halide, hydroxy, alkoxy, aryl moieties). Z is selected from the group consisting of oxygen; sulfur; >S=O; >C=O;

where $R^{20}$ is selected from the group consisting of aryl or acyl moieties (such as acetyl, benzoyl, etc.), a carbon-to-carbon bond, and

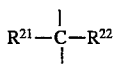

where $R^{21}$ and $R^{22}$ are selected from the group consisting of hydrogen, alkyl radicals having 1 to 4 carbon atoms, and alkenyl radicals having 2 to 4 carbon atoms. n is zero or 1, X is an inorganic or organic anion, and a is the valence of X. Examples of suitable representative X anions include halide, e.g. chloride and bromide, sulfate, bisulfate, nitrate, hydroxide, perchlorate, trifluoromethane sulfonate, acetate, benzene sulfonate, tetrafluoroborate, hexachlorophosphate, hexafluorophosphate, hexachlorostannate, hexafluoroarsenate, hexafluoroantimonate, phenoxide and bisphenoxide.

A further component in the composition is an acid acceptor. Acid acceptors can be inorganic or organic compounds. Organic acid acceptors include sodium stearate, and magnesium oxalate. However, acid acceptors are generally inorganic bases and include magnesium oxide, lead oxide, calcium oxide, calcium hydroxide, dibasic lead phosphite, zinc oxide, barium carbonate, strontium hydroxide, calcium carbonate, etc. The preferred acid acceptors are magnesium oxide and calcium hydroxide. The acid acceptors can be used singly or in combination and preferably are used in amounts ranging from 2 to 25 parts per 100 parts by weight of the polymer.

Preferred elastomeric compositions contain one or more diorgano sulfur oxide compounds. Said diorgano compounds, when compounded with the other ingredients in the composition can function to increase the cure rate of the composition. Said diorgano compounds are known in the art and are described, for example, in U.S. Pat. No. 4,287,320 (Kolb). Said compounds, briefly described, contain at least one sulfur atom, one or two oxygen atoms bonded only to each said sulfur, and additionally, two neutral organic radicals which bond directly to the sulfur atoms by single C—S bonds, and have the general formula $(R^{23})_2SO_x$ wherein x is 1 or 2, and each $R^{23}$ is an organic radical. Each organic radical, $R^{23}$, may be the same or different and each radical may contain from one to twenty or more carbon atoms, although one to about eight carbon atoms are preferred, with a total of not more than about thirty carbon atoms associated with each sulfur atom. The two $R^{23}$ groups together may be a single alkylene group, forming with the sulfur atom a heterocyclic ring. The carbon skeletal chain of the $R^{23}$ groups may be linear, branched, or cyclic, may be aliphatic or aromatic, and may contain catenary hetero atoms, such as oxygen, in addition to carbon. Said chain may be substituted with, e.g., halide, alkoxy, —SOR, —SO$_2$R, carbalkoxy, oxo, hydroxyl, nitro, cyano, alkyl, aryl, or it may be unsubstituted. Such compounds include diorgano sulfoxides, $(R^{23})_2SO$, and diorgano sulfones, $(R^{23})_2SO_2$, and are described, for example in *Basic Principles of Organic Chemistry*, Roberts and Caserio, W. A. Benjamin Company, N.Y., N.Y., 1965, particularly pages 756–760, and *Organic Syntheses*, Vol. 1, pages 718–725, Vol. II, pages 1709–1715, Reinhold Publishing Co., N.Y., N.Y., 1957. Representative diorgano sulfur oxides include dimethylsulfone, tetramethylene sulfone, and bis(4-chlorophenyl) sulfone. Additional diorgano sulfur oxides are described in U.S. Pat. No. 4,287,320 (Kolb) which teachings are incorporated herein by reference.

Fillers are often added to the polymers discussed above to modify properties of the cured elastomer. When a filler is employed it is added to the vulcanization recipe in amounts of up to about 100 parts per hundred parts by weight of rubber, preferably between about 15 and 50 parts per hundred parts by weight of the rubber. Examples of fillers which may be used are reinforcing thermal grade carbon blacks of non-black pigments of relatively low reinforcement characteristics such as clays, barytes, etc.

The organo-onium compound polyhydroxy compound and fluoroaliphatic sulfonyl compound can be introduced to the curable copolymer in the form of finely divided solids by milling said compounds into the copolymer gum stock. Thus mixed, the gum stock can generally be stored at room temperature for extended periods, e.g., up to two years or more. Prior to curing, an acid acceptor is milled into the gum stock containing organo-onium, polyhydroxy and fluoroaliphatic sulfonyl compounds, after which the storage life of the stock is more limited. Of course, all of the components of the curing system may be admixed prior to their incorporation into the elastomer without departing from the scope of this invention. Another method of introducing the components of this invention into the curable copolymer includes making a complex of the metal salt (e.g., sodium, calcium, etc.) of the polyhydroxy compound, and organo-onium compound and adding said complex along with fluoroaliphatic sulfonyl compound and, if desired, any additional polyhydroxy compound to the unvulcanized copolymer. Yet another method of introducing the components of this invention into the curable copolymer includes making a complex of the metal salt of both the polyhydroxy compound and the metal salt of the metal salt of the fluoraliphatic sulfonyl compound with the organo-onium compound and adding the complexes to the unvulcanized copolymer. Said complexes are generally prepared by combining in reactive admixture equimolar amounts of sodium methoxide and polyhydroxy compound and fluoroaliphatic sulfonyl compound in a suitable solvent (e.g., methanol) to form the monosodium salt of the polyhydroxy compound and the monosodium salt of the fluoroaliphatic sulfonyl compound. The resulting salts are then reacted with an equimolar quantity of organo-onium compound to form a complex of the polyhydroxy compound. and organo-onium compound and a complex of the fluoroaliphatic sulfonyl compound and the organo-onium compound.

The polyhydroxy and organo-onium compounds are present in the composition in such relative amounts as to provide the desired cure of the composition when mixed with acid acceptor. Representative proportions of components of the curing system are set forth below in Table 1. All amounts referred to therein are in parts per 100 parts by weight rubber abbreviated "phr" or in millimoles per hundred parts rubber, abbreviated "mmhr", unless otherwise indicated, the "rubber" means the elastomer copolymer or gum. These proportions are general ranges and the particular amount for each particular cure time and temperature will become apparent to those skilled in the art.

TABLE 1

| Component | Amounts |
| --- | --- |
| Acid acceptor | 0.5 to 40 phr |
| Organo-onium compound | 0.2 to 10 mmhr |
| Polyhydroxy compound | 0.3 to 10 mmhr |

When compounded into the gum, the amount of fluoroaliphatic sulfonyl compound should be sufficient, in combination with the aminosilane compound, to result in greater adhesion between the cured elastomer and the substrate surface than could be achieved without the fluoroaliphatic sulfonyl compound. Generally, the fluoroaliphatic sulfonyl compound is used at a level of 0.1 to 10 phr, and preferably 0.2 to 1 phr.

Useful elastomers are obtained within the aforementioned formulation limits, although elastomeric products having particularly desired properties may be obtained by varying the relative amounts of the components within the specified ranges. Preferably, compositions comprise 2.3 to 3.0 mmhr organo-onium compound and 2.0 to 6.0 mmhr polyhydroxy compound. Preferred compositions also contain diorgano sulfur oxide compound, most preferably tetramethylene sulfone and/or dimethyl sulfone, in a concentration range of 0.01 to 5 phr.

In some instances it may also be desirable to add other conventional adjuvants or ingredients, e.g. retarding agents, processing aids, reinforcing agents, plasticizers, and fillers to the gum stock.

In accordance with this invention, the desired amount of fluoroaliphatic sulfonyl compound (if it is to be compounded with the fluoroelastomer gum), acid acceptor, organo-onium compound, polyhydroxy compound, diorgano sulfur oxide compounds, if any, and other conventional adjuvants or ingredients are added to the unvulcanized copolymer (i.e., gum stock) and intimately admixed therewith or compounded by employing any of the usual rubber mixing devices such as Banbury mixers, roll mills, or any other convenient mixing device.

For best results the temperature of the mixture on the mill should not rise above about 120° C. During milling it is necessary to distribute the components and adjuvants uniformly throughout the curable polymer. The curing process typically comprises extrusion or pressing the compounded mixture in a mold (e.g., a cavity or a transfer mold) around an inorganic substrate such as a metal insert, and subsequent oven curing. Pressing of the compounded mixture (press cure) is conducted at a temperature between about 95° C. and about 230° C., preferably between about 150° C. and about 205° C. for a period of from 1 minute to about 15 hours, usually from 5 minutes to 30 minutes. A pressure of between about 700 kPa and about 20,600 kPa, preferably between about 3,400 kPa and about 6,800 kPa is imposed on the compounded mixture in the mold. The molds first may be coated with a release agent, such as a silicone oil, and prebaked. The molded vulcanizate is then usually post cured (oven cured) at a temperature between about 150° C. and about 315° C., usually at about 232° C. for a period of from about 2 hours to 50 hours or more depending on the cross-sectional thickness of the sample. In some applications, e.g., for thick sections, the temperature during the post cure is usually raised gradually from the lower limit of the range to the desired maximum temperature selected. The maximum temperature used is preferably about 232° C. and is held at this value for about 4 hours or more.

Inorganic substrate surfaces should be prepared before coating with primer composition or bonding composition using conventional methods such as those described in Davis, D. J. and Kosmala, J. L., "A Practical Approach to Fluoroelastomer Adhesion to Metal", presented at the Energy Rubber Group Adhesion Symposia, Houston, Tex., May 30, 1985, and the "Chemlok® 607" brochure no. DS10-6005J, published by the Lord Corporation in 1981. For example, nonmetallic surfaces should be thoroughly cleaned using an appropriate solvent. For example, glass may be cleaned using an alkaline bath. The preparation of metallic substrates depends to some extent upon the type of metal. However, where roughening of the substrate surface is desired, the substrate is first degreased using a suitable solvent such as trichloroethylene or Stoddard Solvent, then sandblasted (e.g., using 40 to 60 mesh alumina grit), and then the sandblasted surface can again be degreased.

One major utility of the vulcanized, highly fluorinated elastomers of this invention lies in their use as shaft seals in automotive applications, gaskets, and the like, for containing fluids under pressure at elevated temperatures, as, for example, in hydraulic systems in aircraft, or as components of reactors in the processing of chemicals.

The following examples are offered to aid in a better understanding of the present invention and are not to be unnecessarily construed as limiting the scope thereof.

EXAMPLES

A terpolymer of 32.4 mole % vinylidene fluoride, 42.1 mole % tetrafluoroethylene and 25.5 mole % propylene was used in all of the following examples.

EXAMPLES 1–6 and C1–C5

Compounded curable gumstocks containing various fluoroaliphatic sulfonamides were prepared. The formula for the compounded gumstock is summarized in Table 2. All amounts are expressed in parts by weight, millimoles per one hundred parts by weight of rubber (mmhr), or parts by weight per one hundred parts by weight of rubber (phr).

TABLE 2

| Curable gumstock ingredients | Amount |
| --- | --- |
| Terpolymer gum, parts | 100 |
| Tributyl(2-methoxy)propyl phosphonium chloride, mmhr | 2.3 |
| Bisphenol AF, mmhr | 3.7 |
| Tetramethylene sulfone, phr | 1.0 |
| Carbon black (ASTM N990), phr | 30 |
| Ca(OH)$_2$, phr | 6 |
| MgO (Maglite-D ™), phr | 3 |
| Fluoroaliphatic sulfonamide, mmhr | 1 |

The bisphenol AF and tributyl(2-methoxy)propyl phosphonium chloride were complexed together before being incorporated into the gum. The complex was prepared by reacting 2.3 mmoles of sodium methoxide with 3.7 mmoles of bisphenol AF in methanol to form the monosodium salt of bisphenol AF. This monosodium salt was then reacted with 2.3 mmoles of tributyl(2-methoxy)propylphosphonium chloride. Sodium chloride formed and precipitated out of solution while the bisphenol-phosphonium complex remained in solution. The bisphenol-phosphonium complex, unreacted bisphenol AF, and the other ingredients described above were compounded on a two roll mill using standard methods.

The cure rheology of the samples was investigated by testing uncured, compounded mixtures using the Monsanto Oscillating Disk Rheometer (ODR) Model 100 S and the procedure described in ASTM D 2084-82 (with a micro die, no preheat, an oscillator frequency of 100 cpm and a 3° arc). All samples exhibited good cure.

A primer composition comprising 3-aminopropyltriethoxy silane was prepared by first dissolving 5 weight percent of 3-aminopropyltriethoxy silane in a solution comprising 0.5 weight percent water and 94.5 weight percent methanol. The silane was allowed to hydrolyze for approximately 4 hours. One part of this solution was then diluted with 3 parts by weight of methanol to form said primer. Carbon steel strips which had been freshly sandblasted, and washed two times with trichloroethylene and allowed to air dry were then dipped into the composition comprising hydrolyzed 3-aminopropyltriethoxy and allowed to air dry. The strips were then heated to about 50° C. for about 30 to 45 minutes and allowed to cool to room temperature before the compounded elastomeric gum was applied to the sample and press cured at 177° C. for 10 minutes at 2500 kPa.

After press curing the samples and permitting the cured vulcanizates to cool to room temperature the adhesion of the cured elastomer to the metal strip was evaluated. Adhesive failure, i.e. poor bonding or no bonding, between the cured elastomer composition and the metal strip was characterized by being able to peel the vulcanizate from the metal strip by hand using pliers or by the vulcanizate falling off the metal strip under the force of gravity. Cohesive failure, i.e., good bonding, between the cured elastomer composition and the metal strip was so strongly bonded to the metal strip that the rubber tore instead of peeling from the metal strip even with the use of pliers. Cohesive failure of the elastomer was indicative of a good bond between the cured elastomeric composition and the metal strip. The fluoroaliphatic sulfonamides used in these examples, their bonding quality, and their failure mode are summarized in Table 3.

TABLE 3

| Ex. | Compound | Bond Quality | Failure Mode |
| --- | --- | --- | --- |
| C1 | $CH_3$—⟨phenyl⟩—$SO_2NHCH_3$ | poor | adhesive |
| C2 | $C_8H_{17}SO_2NH_2$ | no bond | adhesive |
| 1 | $CF_3$—⟨F-phenyl⟩—$CF_2SO_2NHC_2H_5$ | very good | cohesive |
| C3 | $C_8F_{17}C_2H_4SO_2NHCH_3$ | no bond | adhesive |
| 2 | $C_8F_{17}SO_2NHCH_3$ | very good | cohesive |
| 3 | $C_8F_{17}SO_2NHCH_2CH=CH_2$ | very good | cohesive |
| 4 | $CH_3NHSO_2(CF_2)_4SO_2NHCH_3$ | very good | cohesive |
| 5 | $C_8F_{17}SO_2NH_2$ | very good | cohesive |
| C4 | $C_8F_{17}SO_2N(C_4H_9)_2$ | no bond | adhesive |
| 6 | $C_8F_{17}SO_2NHCH_2CH_2OCH_2=CH_2$ | good | cohesive |
| C5 | no fluoroaliphatic sulfonamide | no bond | adhesive |

In Examples C1 and C2 the elastomeric composition contained hydrocarbon sulfonamides and not the fluoroaliphatic sulfonamides of this invention. These vulcanizates showed adhesive failure forming only poor bonds or no bonds with the metal strip. Hence, the data shows that a sulfonamide must be fluoroaliphatic to be useful in improving adhesion between the cured fluoroelastomer and metal. Example C3 shows the sulfur atom of the —$SO_2$— moiety must be bonded directly to a strongly electron withdrawing moiety, e.g. a —$CF_2$— moiety, to achieve a good bond. Example $C_4$ shows that the nitrogen atom in the fluoroaliphatic sulfonamide must be bonded to at least one hydrogen atom to achieve a good bond between the cured elastomeric composition and the metal strip.

EXAMPLE 7 AND $C_6$

This example illustrates the concentrations of fluoroaliphatic sulfonamide effective to achieve improved bonding. A compounded gumstock (A) containing $C_8F_{17}SO_2NHCH_3$ (1 mmhr) as the fluoroaliphatic sulfonamide was prepared according to the procedure of Examples 1–6. A similar compounded gumstock (B) was also prepared according to the formula of Table 2 except that it did not contain any fluoroaliphatic sulfonamide. Various amounts of (A) and (B) were then combined to achieve final gumstocks (C) having different fluoroaliphatic sulfonamide concentrations. The resulting samples were then press cured according to the procedure described in Examples 1–6 on carbon steel strips coated with the primer composition described in Examples 1–6. The adhesion between the resulting vulcanizates and the metal strips were evaluated according to the procedure described in Examples 1–6. The ratios of the weights of compounded gumstocks used, (A)/(B), the final concentration of fluoroaliphatic sulfonamide in the gumstocks (C), and the bonding characteristics of the vulcanizates to the metal strips are summarized in Table 4.

TABLE 4

| Ex. | (A)/(B) | Fluoroaliphatic sulfonamide (mmhr) | Bond Quality | Bond Failure |
|---|---|---|---|---|
| 7 | 1/1 | 0.5 | very good | cohesive |
| C6 | 1/3 | 0.25 | no bond | adhesive |

The data shows that the lower limit for this fluoroaliphatic sulfonamide is 0.25 mmhr.

EXAMPLE 8

This example illustrates the preparation and use of the bonding composition.

A bonding composition was prepared by first preparing a 5 weight percent 3-aminopropyltriethoxy silane, 0.5 weight percent water and 94.5 weight percent methanol solution. To 5 g of this solution, 0.3 g of $C_8F_{17}SO_2NHCH_3$ (0.58 mmoles) was dissolved. The resulting solution was then diluted with three times its weight of methanol. This solution was applied to the surface of a metal strip prepared in accordance with the procedure described in Examples 1–6. The strip was allowed to air dry and then heated to about 50° C. for about 30 to 45 minutes and allowed to cool to room temperature.

A fluoroelastomer composition similar to that described in Table 2 was prepared according to the procedure described in Examples 1–6 except that it did not contain any fluoroaliphatic sulfonamide compound. The compounded elastomeric composition was then press cured against the coated metal strip for 10 minutes at 177° C. at 2500 kPa. After curing the vulcanizate was cooled to room temperature, and the adhesion between the metal strip and cured elastomeric composition was evaluated according to the procedure described in Examples 1–6. The vulcanizate exhibited a cohesive failure, that is, a very good bond was formed between the metal strip and the vulcanizate. In fact, the bond appeared to be as strong as the bond formed between metal strip and vulcanizate in Example 2.

EXAMPLE 9 AND C7

These examples illustrate the use of various aminosilane compounds. Metal strips were coated with primer compositions prepared by dissolving 5 weight percent of an aminosilane compound in 94.5 weight percent of methanol and 0.5 weight percent water. The resulting solutions were allowed to hydrolyze for about 4 hours at room temperature and were then diluted with 3 parts by weight of methanol. Cleaned metal strips were then dipped into the resulting solutions and dried according to the procedure describes in Examples 1–6. A compounded gum having the formula described in Table 2, except that it contained 0.5 phr of $C_8F_{17}SO_2NH_2$ as the fluoroaliphatic sulfonamide, was prepared according to the procedure described in Examples 1–6. The compound gum was then press cured against the metal strips for 177° C. for 15 minutes at 2500 kPa. After cooling the vulcanizates to room temperature the bonding between the cured elastomeric composition and metal strips was evaluated according to the procedure described in Examples 1–6. The aminosilane compounds used and the type of bonding characteristics observed are summarized in Table 5.

TABLE 5

| Ex. | Aminosilane | Bond Quality | Failure Mode |
|---|---|---|---|
| 9 | $(CH_3O)SiCH_2CH_2CH_2NHCH_2CH_2NHCH_2CH_2NH_2$ | very good | cohesive |
| C7 | $(CH_3O)_3SiCH_2CH_2CH_2NHCH_3$ | poor | adhesive |

The data indicates the aminosilane compound should have at lest one primary amino moiety to form good bonds.

EXAMPLE 10 AND C8

This example illustrates the use of fluoroaliphatic disulfone compounds as fluoroaliphatic sulfonyl compounds. An elastomeric composition was compounded according to the formula and procedure described in Examples 1–6 except that 1 mmhr of a fluoroaliphatic disulfone, $(C_6F_{13}SO_2)_2CH_2$, was used instead of the fluoroaliphatic sulfonamide compounds used in Examples 1–6.

Metal strips and a primer composition comprising 3-aminopropyltriethoxy silane were prepared according to the procedure described in Examples 1–6, and the metal strips were coated in accordance with the procedure described in Examples 1–6. A sample of the compounded elastomeric composition was then press cured against the coated metal strip in accordance with the procedure described in Examples 1–6, and after the vulcanizate cooled to room temperature, the adhesion between the cured elastomeric composition and the metal strip was evaluated according to the procedure described in Examples 1–6. Cohesive failure of the elastomeric composition was observed indicating that the presence of the fluoroaliphatic disulfone compound was effective at forming a good bond between the cured elastomeric composition and the metal strip.

Various modifications and alterations of this invention will become apparent to those skilled in the art without departing from the scope and spirit of this invention.

We claim:

1. The combination comprising:

(A) A cured elastomeric composition prepared by curing a curable composition comprising:
  (1) fluoroelastomer gum comprising interpolymerized, repeating units derived from vinylidene fluoride, tetrafluoroethylene and copolymerizable hydrocarbon olefin,
  (2) polyhydroxy compound,
  (3) organo-onium compound,
  (4) fluoroaliphatic sulfonyl compound said sulfonyl compound having at least one —$SO_2NH$— or —$SO_2CH$— moiety wherein the sulfur atom of said —$SO_2NH$— or —$SO_2CH$— moiety is also bonded directly to a carbon atom substituted with at least one strongly electronegative or electron withdrawing group, and
  (5) acid acceptor; and
(B) a substrate having an inorganic surface coated with a primer composition comprising aminosilane compound to which the cured elastomeric composition is bonded; wherein the adhesion between the cured elastomeric composition (A) and the substrate (B) is better than would be achieved between a cured composition prepared from a composition comprising components (1), (2), (3) and (5) but not (4) and substrate (B).

2. The composition of claim 1 wherein said fluoroaliphatic sulfonyl compound is selected from the group consisting of fluoroaliphatic sulfonamide compounds and fluoroaliphatic disulfone compounds.

3. The combination of claim 1 wherein said fluoroaliphatic sulfonyl compound has one of the general formulas:

$$R_fSO_2X$$

$$R_f'(SO_2NHR^5)_2$$

where, in the above formulas:
  X is selected from the group consisting of —$NHR^6$ and —$CHR^7SO_2R_f$,
  $R^5$ and $R^6$ can be selected from the group consisting of hydrogen or monovalent organic radicals having from 1 to 15 carbon atoms;
  $R^7$ is selected from H, Br, Cl, I, alkyl groups having 1 to 20 carbon atoms, alkenyl groups having 3 to 4 carbon atoms, aryl and alkaryl groups having up to 10 carbon atoms;
  $R_f$ is a monovalent fluoroaliphatic radical having 1 to 20 carbon atoms; and
  $R_f'$ is a divalent fluoroaliphatic radical having 1 to 20 carbon atoms.

4. The combination of claim 3 wherein $R_f$ has 4 to 20 carbon atoms and is selected from the group consisting of perfluoroalkyl or perfluorocycloalkyl radicals or combinations thereof.

5. The combination of claim 3 wherein $R_f'$ has 4 to 20 carbon atoms and is selected from the group consisting of perfluoroalkylene or perfluorocycloalkylene radicals or combinations thereof.

6. The combination of claim 1 wherein said aminosilane compound in said primer composition has the general formula:

$$(R^1O)_aSi(R^2)_b$$

where, in the above formula:
  a is 2 or 3,
  b is 1 or 2, and a+b is 4;
  $R^1O$ is a monovalent, organic, hydrolyzable group having 1 to 8 carbon atoms; and
  $R^2$ is a monovalent organic radical having from 1 to 20 carbon atoms that is selected from the group consisting of alkyl, alkenyl, aryl, arylalkyl and arylalkenyl radicals;
  with the proviso that at least one of said $R^2$ groups contains a primary amino moiety.

7. The combination of claim 6 wherein a is 3, b is 1, and $R^1O$ is selected from the group consisting of methoxy, ethoxy, and acetoxy groups and $R^2$ has from 1 to 12 carbon atoms.

8. The combination of claim 7 where $R^2$ has the general formula:

$$—(R^3NH)_cR^4NH_2$$

where, in the above formula:
  c is a number from 1 to 5; and
  $R^3$ and $R^4$ moieties are divalent organic moieties having from 1 to 10 carbon atoms which moieties may each independently be selected from the group consisting of alkylene, alkenylene, arylene moieties and combinations thereof.

9. The combination of claim 1 wherein said aminosilane compound is selected from the group consisting of N-(2-aminoethyl)-3-aminopropyltrimethoxysilane, N-[ 2(vinylbenzylamino)ethyl]3-aminopropyltrimethoxysilane, 4-aminobutyltriethoxysilane, (aminoethylaminomethyl)phenethyltrimethoxysilane, N-(2-aminoethyl)-3-aminopropylmethyldimethoxysilane, N-(2-aminoethyl)-3-aminopropyltris(2-ethylhexoxy)silane, 6-(aminohexylaminopropyl)trimethoxysilane, p-aminophenyldimethoxysilane, 3-(1-aminopropoxy)-3,3-dimethyl-1-propenyltrimethoxysilane, 3-aminopropyltris(methoxyethoxyethoxy)silane, 3-aminopropylmethyldiethoxysilane, 3-aminopropyltriethoxysilane, 3-aminopropyltrimethoxysilane, and w-aminoundecyltrimethoxysilane.

10. The combination of claim 1 wherein the fluoroaliphatic sulfonyl compound is present in the elastomeric composition at a concentration of 0.1 to 10 phr.

11. The combination of claim 1 wherein the fluoroaliphatic sulfonyl compound is present in the elastomeric composition at a concentration of 0.2 to 1 phr.

12. The combination of claim 1 wherein the inorganic surface of the substrate is metal.

* * * * *

UNITED STATES PATENT AND TRADEMARK OFFICE
CERTIFICATE OF CORRECTION

PATENT NO. : 5,478,652  
DATED : December 26, 1995  
INVENTOR(S) : Werner M. Grootaert, Robert E. Kolb and George H. Millet Page 1 of 2

It is certified that error appears in the above-indentified patent and that said Letters Patent is hereby corrected as shown below:

Col. 6, line 17, delete "electro negative" and insert therefor --electronegative--.

Col. 6, line 22, delete

" $(-(-CF=)CF-$ . "

and insert therefor

-- $-(-CF=)CF$ --

Col. 11, line 43, delete

" $R^{17}\nearrow$ "

and insert therefor

-- $R^{17}\swarrow$ --.

UNITED STATES PATENT AND TRADEMARK OFFICE
CERTIFICATE OF CORRECTION

PATENT NO. : 5,478,652
DATED : December 26, 1995
INVENTOR(S) : Werner M. Grootaert, Robert E. Kolb and George H. Millet It is certified that error appears in the above-indentified patent and that said Letters Patent is hereby corrected as shown below:

Col. 19, line 38, delete "$R_f$," and insert therefor --$R_f$;--.

Col. 20, line 37, delete "[ 2(--" and insert therefor --[2(--.

Signed and Sealed this

Seventh Day of January, 1997

*Attest:*

BRUCE LEHMAN

*Attesting Officer*   *Commissioner of Patents and Trademarks*